United States Patent [19]
Thornsberry

[11] Patent Number: 5,450,676
[45] Date of Patent: Sep. 19, 1995

[54] SLOPE ANGLE AND LEVEL INDICATOR APPARATUS

[76] Inventor: William H. Thornsberry, 200 S. Main, P.O. Box 64, Sumner, Mo. 64681

[21] Appl. No.: 231,223

[22] Filed: Apr. 21, 1994

Related U.S. Application Data

[63] Continuation-in-part of Ser. No. 80,481, Jun. 18, 1993, abandoned.

[51] Int. Cl.$^6$ .............................................. G01C 9/06
[52] U.S. Cl. .................................... 33/366; 33/396
[58] Field of Search ................... 33/333, 364, 365, 366, 33/370, 377, 379, 381, 389, 391, 396

[56] References Cited

U.S. PATENT DOCUMENTS

| | | | |
|---|---|---|---|
| 466,380 | 1/1892 | Spencer | 33/365 |
| 2,494,278 | 1/1950 | Badovinac | 33/365 |
| 3,657,551 | 4/1972 | Lingert et al. | 33/366 |
| 4,554,535 | 11/1985 | Floris et al. | 33/366 |
| 4,707,927 | 11/1987 | Hiyama | 33/366 |
| 4,790,076 | 12/1988 | Adams | 33/365 |
| 4,923,015 | 5/1990 | Barsby et al. | 33/366 |
| 5,075,978 | 12/1991 | Crowe | 33/381 |
| 5,237,753 | 8/1993 | Carlson et al. | 33/366 |

FOREIGN PATENT DOCUMENTS

| | | | |
|---|---|---|---|
| 227232 | 9/1985 | Germany | 33/366 |

*Primary Examiner*—William A. Cuchlinski, Jr.
*Assistant Examiner*—G. Bradley Bennett
*Attorney, Agent, or Firm*—Gambrell Wilson & Hamilton

[57] ABSTRACT

A slope/level indicating apparatus for determining the degree of slope or grade being created by a machine, such as a grader. The apparatus comprises a slope indicator unit which transmits slope information through a cable to a digital display which can be viewed by an operator. The slope indicating unit comprises one or more tubular chambers, each of which has a substantially rectangular transverse cross-section, and each of which includes a disk that can move freely within the tubular chamber. The tubular chamber is machined or molded with the longitudinal axis curved in an arc of one or more predetermined radii so that the disk moves within the tubular chamber according to the earth's gravitational force vector. A plurality of photodetectors are situated preferably evenly spaced behind the tubular chamber and are preferably placed such that they detect transitions of slope of the tubular chamber based on the position of the disk within the tubular chamber. A light source located on the opposite side of the tubular chamber shines light onto and through each tubular chamber, the light being received by the respective photodetectors except the one being blocked by the disk. In this manner, the machine operator is kept apprised in real time of the level of slope being created and/or used by the machine.

18 Claims, 3 Drawing Sheets

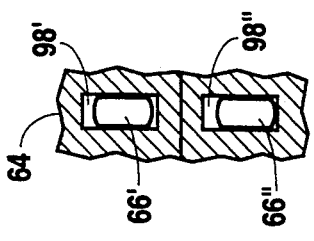
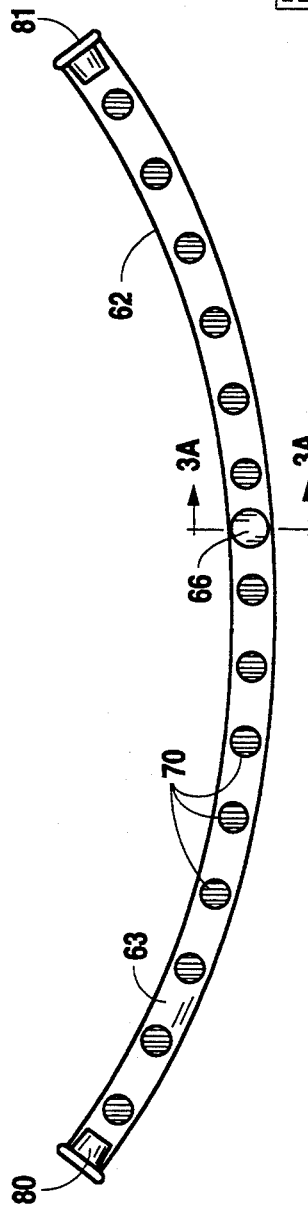
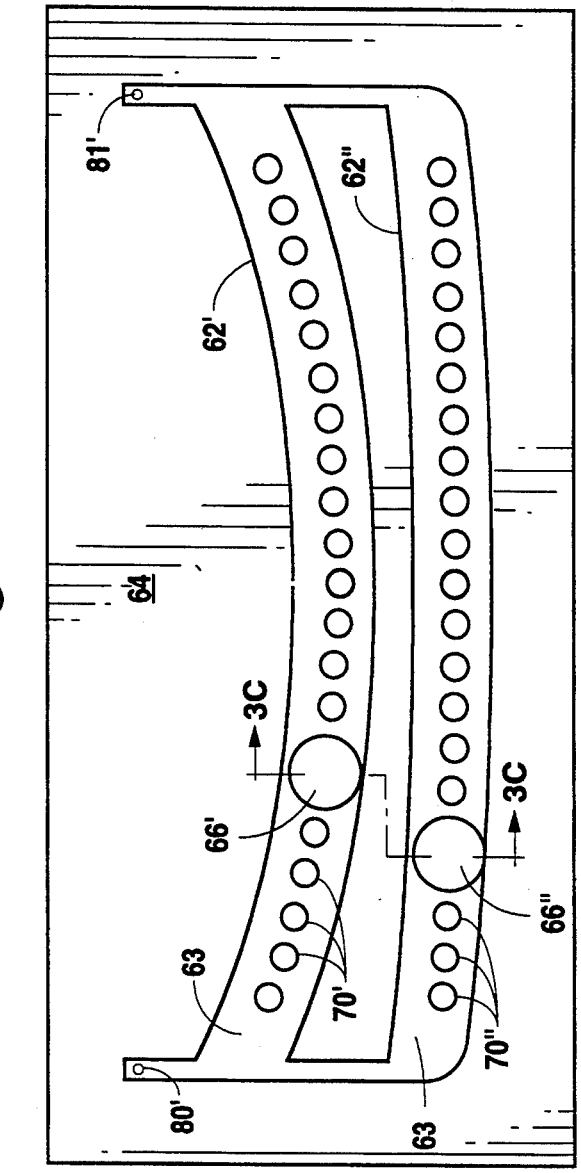
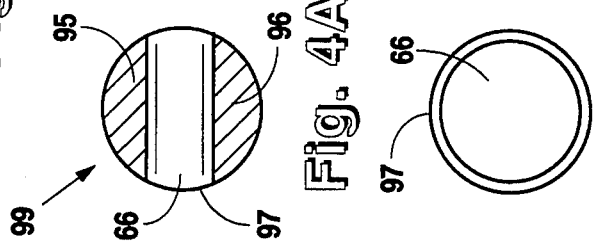

SLOPE ANGLE AND LEVEL INDICATOR APPARATUS

CONTINUATION INFORMATION

This application is a continuation-in-part of application Ser. No. 08/080,481 filed Jun. 18, 1993.

BACKGROUND

1. Field of the Invention

The present invention relates generally to a method and apparatus for measuring the angle of a slope in relation to a horizontal or vertical plane in applications such as road graders, high extending dump trucks, asphalt paving machines, and drill rigs, among others.

2. Description of the Related Art

Many different operations include machinery which creates a slope or grade having a predetermined angle relative to the horizontal plane. Other types of machinery are used to dig holes that must be as perpendicular as possible relative to the earth's horizontal plane (i.e., vertical). Examples of the above types of machinery are road graders, asphalt paving machines and machinery used in construction and certain drill rig applications, among others.

For example, new roads being built by contractors require a series of grading and surveying operations to develop a roadway with the proper slope. In developing new roadways, a machine referred to as a road grader is used to place a grade of predetermined slope on the sides of the roadway. Road graders are basically constructed in the following manner. The motor, front wheels and rear drive wheels are mounted on a frame with the movable blade mounted between the front and rear wheels. This same frame also holds the seat and cab floor on which the operator either sits or stands.

Two alternative methods are currently available to aid the operator in properly positioning the road grader blade to create the desired percent of cross slope or grade. In the first method, referred to as blue-topping, the operator uses a series of reference points set in the ground that relate to the vertical distance versus the horizontal plane. These points are placed by a survey crew, which is a costly expense. The grader operator must constantly adjust the blade to maintain contact with the ground at the elevation designated by the reference points on either side of the blade. This requires constant attention of the operator to the ground level and the controls, creating a safety hazard. Also, the low road grader speed required to perform this operation greatly reduces productivity.

In the second method, a laser beam sending unit produces a beam which contacts a receiving unit mounted on the grader which indicates the adjustments that must be executed by the grader operator. However, this is only effective in isolated areas due to the separation required between the sending unit and receiving unit. Also, the sending unit must be moved when the grade changes or when the laser beam reaches its limit, which makes this method impractical for many applications.

Because of problems in applying these alternative methods, in many cases the slope graded into the roadway is simply determined by the sense of feel of the operator. Older, full time operators improve this sense of feel after many years of experience. However, most graders are owned by counties or townships and are used part time by operators who do not get enough grader time to develop a sense of feel. Therefore, most rural or country roads develop a negative or excessive slope which makes for poor drainage or erosion. With respect to gravel roads, much gravel is lost every year by improper grading, and in most instances, gravel is lost from the roadway where it cannot be reclaimed. In summary, creating a grade in a roadway using only the operator's sense of feel is commonly done, but it is very inefficient and inexact and many times leads to poor results.

Currently, however, there is no simple and reliable method for aiding an operator in properly forming a grade or slope. Thus, there has been a long-felt need for a simple and reliable method and apparatus which measures the slope of a grade and provides feedback to an operator to assure predictably accurate grades even by relatively inexperienced operators.

In many other applications, it would also be desirable to have an apparatus which provides a reliable determination of slope angle or level. In certain drilling rig or construction applications, for example, it is necessary for the rig to drill a hole that is as perpendicular as possible to the earth's horizontal plane, (i.e., the hole should be vertical). For example, when holes are being dug for piers or other support structures, it is important that the hole be as vertical as possible for maximum strength and support. However, there is currently no method for monitoring the extent to which a hole being dug is perpendicular relative to the earth's local gravity vector.

Considering anther example, certain dump trucks are referred to as high extending dump trucks. If the bed of such a dump truck is raised upward too far, the truck is liable to tip over. Each year in the United States, there are numerous instances of dump trucks tipping over because of the truck bed being extended upward too far or because of load shifting during loading or transport. In such instances, there is much time and expense associated with "righting" the dump trucks. Currently there is no method for monitoring the slope of a dump truck bed and warning the driver or operator when the bed has been extended past safe limits.

In other applications as well, it would be desirable to have a simple device which can accurately measure the slope of a grade and provide this information to a user in real time. Therefore, an apparatus is desired which provides a reliable measurement of the slope of a grade or a level indication.

SUMMARY OF THE INVENTION

The present invention comprises a slope/level indicating apparatus for determining the degree of slope or grade being created by a machine, such as a grader. Alternatively, the device measures the degree of verticality of a drill or the degree of slope of a blade or other tool creating a slope or grade relative to the earth's local gravitational force vector. The apparatus comprises a slope indicator unit and monitoring means which transmits slope information from the slope indicator unit through a cable to a (preferably) digital display for displaying slope to an operator. In this manner, the operator is constantly kept apprised of the level of slope being created and/or used by the machine to which the apparatus is attached.

The slope indicating unit preferably comprises a housing to which are attached one or more preferably fluid-filled elongated tubular chambers of substantially rectangular transverse cross-section, each tubular chamber having a longitudinal axis and including a disk disposed within the tubular chamber so that the disk can move (preferably roll) freely substantially along the longitudinal axis within the tubular chamber under the influence of gravity. The longitudinal axis of each tubular chamber is curved, preferably in the shape of an arc of a circle having a predetermined radius, or a curve having two or more radii, so that the disk can move to the lowest point within the tubular chamber according to the orientation of the tubular chamber with respect to the earth's local gravitational force vector.

The monitoring means comprises a light source and a plurality of photodetectors, and it receives slope information from the slope indicating unit for locating the disk within the tubular chamber. Disk location information is sent to a (preferably digital) display for displaying slope based on the location of the disk. Disk location within the tubular chamber is indicated by a plurality of photodetectors which are connected to the housing and substantially evenly spaced along each tubular chamber's longitudinal axis, being preferably placed such that they can detect substantially equal changes in the slope of the tubular chamber longitudinal axis, such changes being indicated by movement of the disk in front of the photodetectors so as to substantially prevent light from entering one photodetector. One or more light sources are connected to the housing and positioned on the opposite side of each tubular chamber from the photodetectors. Thus, the photodetectors are located behind the tubular chamber relative to the light source(s) for detecting light from the light source(s). The light shines on and passes through each tubular chamber and is detected by the photodetectors except for the one being blocked by the disk in each tubular chamber. Therefore, the position of the disk within the tubular chamber is indicated by which photodetector is blocked (i.e., which photodetector has its light input significantly reduced by a disk within the light path). Thus, the monitoring means monitors the disk location within the tubular chamber and generates signals indicative thereof. This, in turn, is an indication of the tubular chamber slope being monitored, based on blockage of light to a photodetector. The information (signals) provided by the respective photodetectors is transmitted through a cable to a (preferably) digital display to indicate the tubular chamber slope to the operator based on which photodetector is not receiving light from the light source(s).

In this manner, the degree of slope can be accurately, continuously and safely monitored in real time by an operator. This greatly simplifies operations where a slope or level determination is necessary.

Note that the disk does not generally have the shape of a right circular cylinder because the disk edge is preferably not straight from one side of the disk to the other. Certain preferred embodiments of disks have a disk edge with a regular side-to-side curvature which may be of a substantially constant radius. In one preferred embodiment, the radius of disk edge side-to-side curvature is substantially equal to half of the disk diameter. In the latter case, the disk will appear to have been cut from the central portion of a sphere by two parallel planes spaced apart a distance equal to the disk thickness. The disk edge in this case has a partially spherical shape. In other cases, the disk edge shape desired for a particular application of the invention may not be a portion of a spherical surface and may preferably be determined empirically.

This is because placement of such a disk within an elongated tubular chamber having a substantially rectangular transverse cross-section results in spaces between the disk and the tubular chamber wall, such disk-chamber clearance spaces comprise first, the space between the disk sides and the tubular chamber sides and second, the space between the disk edge and the tubular chamber wall, the latter space being variable, depending on where along the curved disk edge the measurement is taken.

An important function of the above disk-chamber clearance spaces is to furnish damping which slows movement of the disk in the tubular chamber. Fluid (e.g. liquid) within the tubular chamber may be chosen to have a viscosity which, in conjunction with the chosen disk-chamber clearance spaces, will substantially reduce or prevent excessive disk movement in whatever vibration environment is expected for the tubular chamber. Both increases in fluid viscosity and decreases in disk-chamber spaces will tend to smooth disk movement within the tubular chamber, but the choice of how to balance disk-chamber spaces and fluid viscosity in any vibration environment will preferably be made empirically.

Note also that the choice of using one or more radii of curvature along the longitudinal axis of a tubular chamber, as well as the choice of whether to use one or more tubular chambers (preferably having different radii of curvature) is best made empirically, considering the space available for monitoring the tubular chamber(s) and the required angular range, accuracy and vibration resistance of the slope indicating unit for a given application.

BRIEF DESCRIPTION OF THE DRAWINGS

A better understanding of the present invention can be obtained when the following detailed description of the preferred embodiment is considered in conjunction with the following drawings, in which:

FIG. 3 schematically illustrates a single tubular chamber.

FIG. 3A schematically illustrates a partial cross-sectional view of the tubular chamber of FIG. 3.

FIG. 3B schematically illustrates a dual tubular chamber.

FIG. 3C schematically illustrates partial cross-sectional views of the dual tubular chamber of FIG. 3B.

FIGS. 4A and 4B, respectively, schematically illustrate plan and side elevation views of a sphere, showing the fabrication of one embodiment of a disk from the sphere.

DETAILED DESCRIPTION

Figure 1:
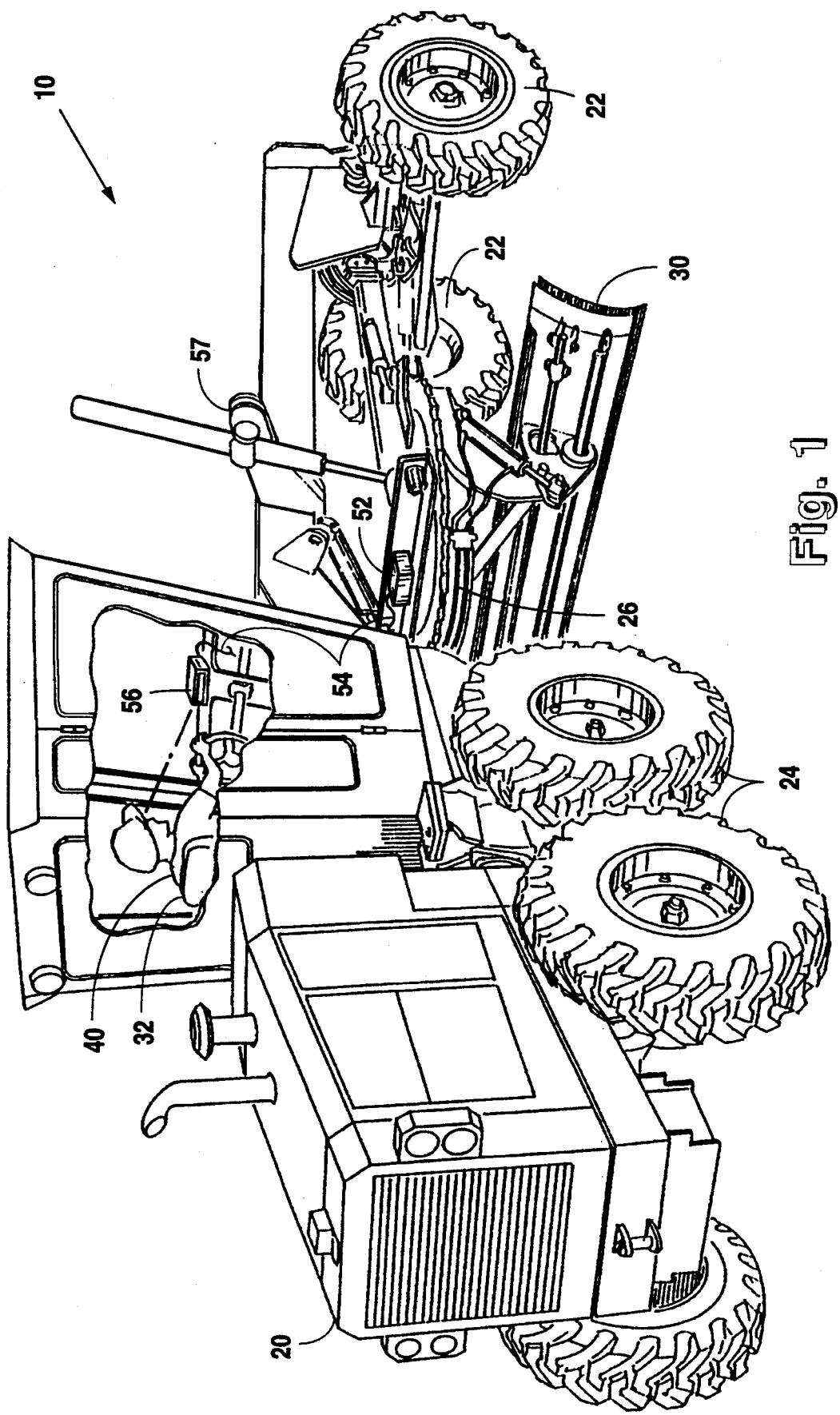
FIG. 1 schematically illustrates a grader utilizing the slope/level indicating apparatus of the present invention.

Referring now to FIG. 1, the slope/level indicating apparatus of the present invention is shown being used on a road grader 10. In the description that follows, the present invention is described as being used in a road grading application. However, the use of the present invention in other applications and with other machinery, such as asphalt paving machines, drill rigs, construction applications, and high extending dump trucks, among others, is also contemplated. The grader 10 includes a motor 20, front wheels 22, and rear wheels 24 which are mounted on a frame 26 with a positionable blade 30 mounted between the front and rear wheels 22 and 24, respectively. The frame 26 also holds a seat 32 and cab floor (not shown) on which operator 40 either sits or stands. A preferred embodiment of the slope/level indicating apparatus according to the present invention, as schematically illustrated in FIG. 1, includes a slope indicating unit 52, a cable 54, and a digital display 56 which provides a real time indication of the slope or grade being formed by the blade 30.

In order to give the operator 40 an indication of how the slope is being built into the roadway, it is necessary to index the grader blade 30 properly to the grader center of gravity (not shown). Since the operator 40 is either seated or standing on a part of the grader 10 separate from the grader blade 30, any kind of indicator located in the cab area will not give the operator 40 the correct information as the blade 30 has already made a cut or pass over the roadway before the rear wheels 24 pass over the graded area.

Therefore, the slope indicating unit 52 is preferably housed on the mold board circle of the road grader 10, as shown. Alternatively, the slope indicating unit 52 is located on the frame of the blade circle. Various placements are possible, but the unit 52 should preferably be mounted below the pivot point 57 of the blade 30. The cable 54 transmits data from the slope indicating unit 52 to a digital display 56 which is preferably situated in the cab within the view of operator 40. In this manner, the slope indicating unit 52 monitors the slope of the grader blade 30 as the blade 30 passes over the roadway and transmits this data back to the digital display 56 viewed by the operator 40. The operator 40 can then adjust the controls of the grader 10 to achieve the desired slope. Alternatively, the information from the slope indicating unit 52 can be transmitted through the cable 54 directly to the controls of the grader to automatically control the grade being formed. Note that the slope indicating unit 52, when mounted as shown, is subject to strong vibration forces in use. As described herein, the present invention is especially designed to provide reliable slope information in such an environment.

Figure 2:
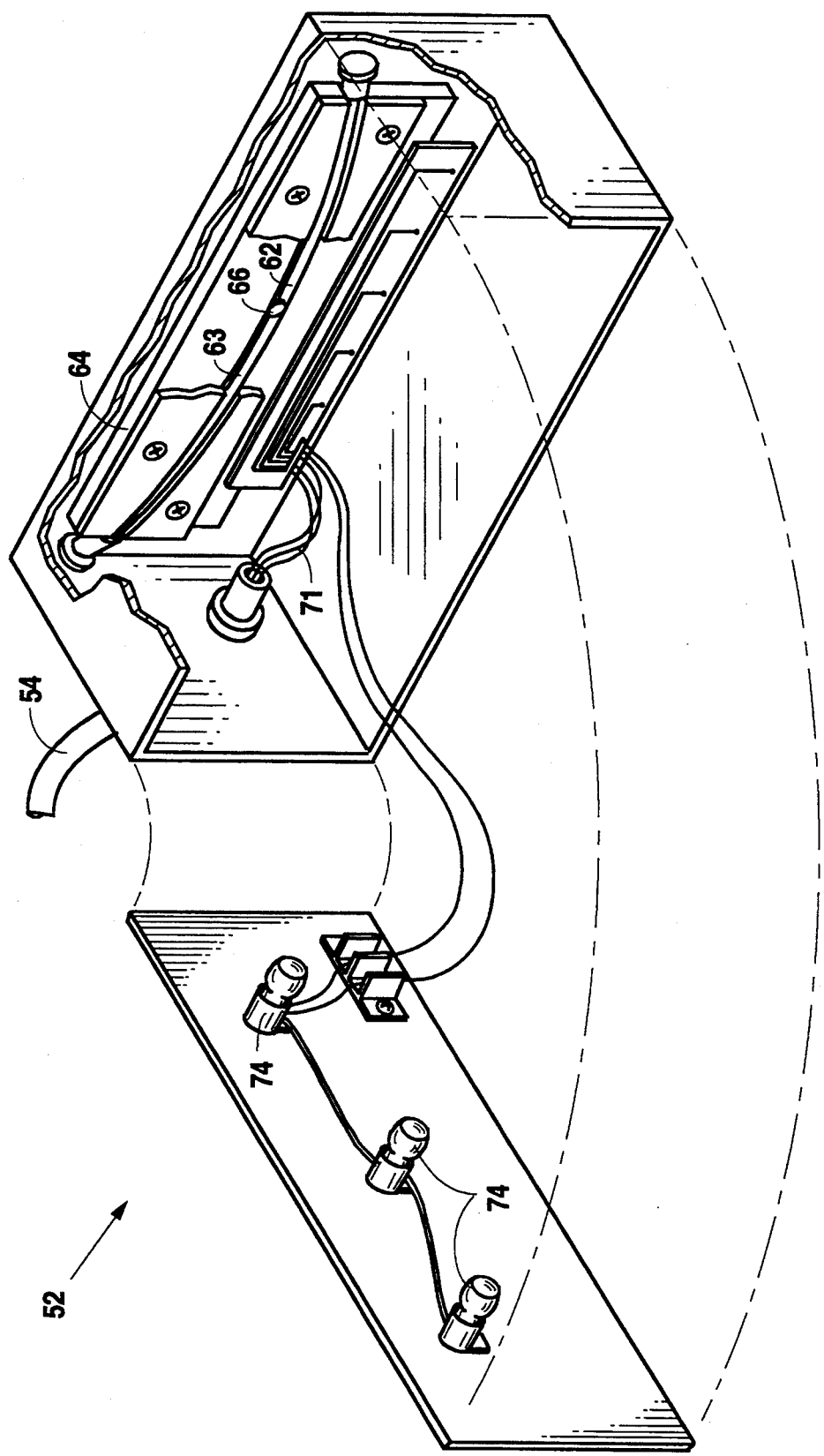
FIG. 2 is a cutaway drawing schematically illustrating the internal components of a slope indicating apparatus used in FIG. 1.

Referring now to FIGS. 2, 3, 3A, 3B, 3C, 4A and 4B the slope indicating unit 52 preferably comprises at least one tubular chamber 62 machined or molded into plate 64, as shown in FIG. 2. Alternatively, more than one tubular chamber may be used, (each tubular chamber preferably having a different longitudinal axis of curvature) as the two tubular chambers 62', 62" shown within plate 64 in FIG. 3B. Thus, a rectangular tubular chamber or chambers, (shown in partial transverse cross-section at section 3A—3A in FIG. 3 and at section 3C—3C and CC in FIG. 3B) having a predetermined radius or radii of curvature along the longitudinal tubular chamber axis is machined or molded into plate 64. In each of the illustrated embodiments, the tubular chamber(s) have a height of 0.020 inch more than the diameter of the enclosed disk(s) 66, 66', 66" and 0.020 inch wider than the thickness of the disk(s) 66, 66', 66". This disk-chamber clearance space 98, 98', 98" around disk(s) 66, 66', 66" allows the disk(s) 66, 66', 66" to move freely and also acts as a metering aperture for the liquid (preferably kerosene) 63 which is sealed within the tubular chamber(s) 62, 62', 62" by stoppers 80, 81 and 80', 81'. Such liquid 63 acts as a dampening agent to prevent any rapid or erratic movement of the disk(s) 66, 66', 66" when extreme vibrations occur, and also provides lubrication for the enclosed disk(s) 66, 66', 66". In the preferred embodiment illustrated, the disk(s) 66, 66', 66" comprises metal and rolls freely within a tubular chamber, but the disk(s) 66, 66', 66" may comprise any opaque material (e.g., plastic) having the proper shape and being substantially nonreactive with fluid 63.

The shape of disk(s) 66, 66', 66" is preferably used because a substantially spherical object would tend to refract light to the photodetectors 70, 70', 70". FIGS. 4A and 4B schematically illustrates how a disk 66 may be fabricated from a sphere 99. The plan view (FIG. 4A) shows portions 95, 96 of the sphere 99 which must be removed to form disk 66. Both plan and elevation view shows disk edge 97 which is part of the original surface of sphere 99. Light refraction from the disk edge 97 is less troublesome than that from a substantially spherical object would be because the diameter of disk(s) 66, 66', 66" is substantially greater than its thickness.

A plurality of photoelectric cells or photodetectors 70, 70', 70" are preferably positioned in increments of one degree (in a tubular chamber having a longitudinal axis bent in a substantially circular arc) along the circumference of and behind the tubular chamber(s) 62, 62', 62". The photodetectors 70, 70', 70" are best illustrated in FIGS. 3 and 3B. The number of photodetectors used depends on the range and resolution needed in slope/level detection. The photodetectors 70, 70', 70" may be spaced in greater or lesser increments than one degree, depending on the granularity of slope being detected.

One or more light sources 74 are located inside the slope indicating unit 52 opposite of the tubular chamber(s) 62, 62', 62". The light source(s) 74 shine light on the tubular chamber(s) 62, 62', 62", passing through the fluid 63 onto the photodetectors 70, 70', 70". The light source(s) 74 are preferably 12 V lamps when used on a grader having a 12 V electrical system. The disk(s) 66, 66', 66" acts to block the reception of light by a photodetector 70, 70', 70" that the disk(s) 66, 66', 66" is in front of. As previously mentioned, the location of the disk(s) 66, 66', 66" within tubular chamber(s) 62, 62', 62" is dictated by the force of gravity and thus is an indication of the level of slope of tubular chamber(s) 62, 62', 62". The photodetectors 70, 70', 70" generate electrical signals on corresponding wires 71 indicative of the position of the disk(s) 66, 66', 66", and the signals are transmitted to the digital display 56 by the electrical cable 54. The digital display 56 includes simple logic which converts these signals into corresponding digits, and thus the display 56 numerically displays the degree of slope.

In a preferred embodiment, the digital display 56 comprises 3 seven-segment digital displays and simple decoder logic circuitry which convert the electrical signals from the slope indicating unit 52 to degrees showing the right or left drop of the blade from the level or horizontal position. The center display shows "0" when the blade is in the level position and this is the only time the center display is lighted. Because the circuitry used to translate these electrical signals to a numerical or digital display is well known in the art, details of its construction are omitted for simplicity.

The photodetectors 70, 70', 70" lights 74, and digital display 56 are preferably powered by a battery (not shown) of the road grader 10, but an independent power supply may also be used.

In this manner, the slope indicating apparatus provides a real time analysis of the degree of slope or grade being formed by a road grader 10. This provides a much more convenient and accurate method of forming grades. Also, by placing the digital display 56 in the cab near the operator 40, the operator 40 is no longer required to continually search for reference points in the ground. This considerably improves the safety of operation.

As previously noted, the slope/level indicating apparatus has many other applications. For example, in another embodiment the slope/level indicating apparatus is connected to the screed of a paving machine (not shown) to inform the operator of the degree of slope being formed on the roadway. In construction applications where a hole is being dug for piers or other support members, the slope/level indicating apparatus of the present invention can be used to ensure that the hole is sufficiently perpendicular to the earth's horizontal plane to provide for the strength and stability for the structure being built. In another embodiment, the slope indicating unit 52 is housed in the boom of a drill rig to ensure that the drill rig is digging a hole substantially parallel to the local gravity vector. In yet another embodiment, the slope indicating unit 52 is attached to the bed of a high extending dump truck and transmits information regarding the slope of the bed to the dump truck operator. In this manner, the operator is constantly apprised of the slope of the bed and can more easily prevent the dump truck from tipping over.

In summary, the present invention can be used in any application where it is important to monitor the slope or angle of equipment relative to the local gravity vector. The present invention provides a simple and reliable method for determining the degree of slope being formed and/or the relative slope of a piece of machinery.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A slope/level indicating apparatus comprising:
   a housing;
   a tubular chamber having a substantially rectangular transverse cross-section and longitudinal axis, said tubular chamber being attached to said housing and being curved along said longitudinal axis;
   a disk having a diameter substantially greater than its thickness, said disk being disposed within said tubular chamber and having a disk-chamber clearance space around said disk allowing said disk to move freely within said tubular chamber according to a gravitational force;
   a liquid sealed within said tubular chamber, said disk-chamber clearance space acting as a metering aperture for said liquid; and
   monitoring means for locating said disk within said tubular chamber and for displaying a slope based on the location of said disk within said tubular chamber.

2. The slope/level indicating apparatus of claim 1, wherein said monitoring means comprises:
   a light source connected to said housing which shines light on said tubular chamber;
   a plurality of photodetectors connected to said housing and located behind said tubular chamber relative to said light source for detecting light from said light source, wherein said disk blocks the transmission of light from said light source to one of said plurality of photodetectors;
   a display to indicate slope of said tubular chamber based on blockage of light to one of said plurality of photodetectors; and
   a cable connecting said display with said photodetector.

3. The slope/level indicating apparatus of claim 2, wherein said plurality of photodetectors are placed such that they can detect substantially equal changes in the slope of said tubular chamber longitudinal axis.

4. The slope/level indicating apparatus of claim 1, wherein said disk comprises a disk edge, said edge having a partial spherical shape.

5. The slope/level indicating apparatus of claim 4, wherein said disk is fabricated from a sphere.

6. The slope/level indicating apparatus of claim 1, wherein said liquid disposed within said tubular chamber and surrounding said disk, is kerosene.

7. The slope/level indicating apparatus of claim 6, wherein said disk-chamber clearance space is 0.020 inch higher than said disk diameter and 0.020 inch wider than said disk thickness.

8. An apparatus for indicating the degree of slope being formed by a road grader, wherein said road grader comprises front wheels, rear drive wheels, a movable blade mounted between the front and rear wheels on a pivot point and a cab where an operator controls the road grader, the apparatus comprising:
   a slope/level indicating apparatus situated below the blade pivot point on said grader, said slope/level indicating apparatus comprising:
   a housing;
   a tubular chamber having a substantially rectangular transverse cross-section and longitudinal axis, said tubular chamber being attached to said housing and being curved along said longitudinal axis;
   a disk having a diameter substantially greater than its thickness, said disk being disposed within said tubular chamber and having a disk-chamber clearance space around said disk allowing said disk to move freely within said tubular chamber according to a gravitational force; and
   monitoring means for monitoring the location of said disk within said tubular chamber and generating signals indicative thereof, said monitoring means comprising a display located in said cab for displaying the slope based on the location of said disk within said tubular chamber.

9. The apparatus of claim 8, wherein said display is digital.

10. The slope level indicating apparatus of claim 8, further comprising a liquid sealed within said tubular chamber, said disk-chamber clearance space acting as a metering aperture for said liquid.

11. The slope/level indicating apparatus of claim 10, wherein said liquid comprises kerosene.

12. The slope/level indicating apparatus of claim 11, wherein said disk comprises metal.

13. The slope indicating apparatus of claim 11 wherein said disk comprises plastic.

14. A slope/level indicating apparatus comprising:
a housing;
a plurality of tubular chambers, each tubular chamber having a substantially rectangular transverse cross-section and longitudinal axis, each said tubular chamber being attached to said housing and being curved along said longitudinal axis;
a disk having a diameter substantially greater than its thickness disposed within each said tubular chamber, each said disk having a disk-chamber clearance space around said disk allowing said disk to move freely within said tubular chamber according to a gravitational force;
a liquid sealed within each said tubular chamber, each said disk-chamber clearance space acting as a metering aperture for said liquid; and
monitoring means for monitoring the location of each said disk and for transmitting a slope value based on the location of each said disk within said tubular chamber.

15. An apparatus for indicating the degree of slope being formed by a road grader, wherein said road grader comprises front wheels, rear drive wheels, a movable blade mounted between the front and rear wheels on a pivot point and a cab where an operator controls the road grader, the apparatus comprising:
a slope/level indicating apparatus situated below the blade pivot point on said grader, said slope/level indicating apparatus comprising:
a housing;
a plurality of tubular chambers, each said tubular chamber having a substantially rectangular transverse cross-section and longitudinal axis, each said tubular chamber being attached to said housing and being curved along said longitudinal axis;
a disk having a diameter substantially greater than its thickness disposed within each said tubular chamber, each said disk having a disk-chamber clearance space around said disk allowing said disk to move freely within said tubular chamber according to a gravitational force; and
monitoring means for monitoring the location of each said disk within each said tubular chamber and generating signals indicative thereof, said monitoring means comprising a display located in said cab for displaying the slope based on the location of said disk within said tubular chamber.

16. The apparatus of claim 15 additionally comprising a liquid sealed within at least one of said plurality of tubular chambers, said disk-chamber clearance space acting as a metering aperture for said liquid.

17. The apparatus of claim 16, wherein said liquid sealed within at least one of said plurality of tubular chambers is kerosene.

18. The apparatus of claim 17, wherein at least one said disk-chamber clearance space is 0.020 inch higher than said disk diameter and 0.020 inch wider than said disk thickness.

* * * * *